(12) United States Patent
Kim et al.

(10) Patent No.: US 11,740,164 B2
(45) Date of Patent: Aug. 29, 2023

(54) BENDING TEST APPARATUS AND BENDING TEST METHOD USING THE SAME

(71) Applicant: Samsung Display Co., LTD., Yongin-si (KR)

(72) Inventors: Kyoung Tae Kim, Hwaseong-si (KR); Sung Su Hong, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 394 days.

(21) Appl. No.: 17/166,439

(22) Filed: Feb. 3, 2021

(65) Prior Publication Data

US 2021/0348995 A1    Nov. 11, 2021

(30) Foreign Application Priority Data

May 11, 2020    (KR) .......................... 10-2020-0055604

(51) Int. Cl.
*G01N 3/20*    (2006.01)
*G01N 3/32*    (2006.01)
(Continued)

(52) U.S. Cl.
CPC .................. *G01N 3/02* (2013.01); *G01N 3/20* (2013.01); *G01N 2203/0023* (2013.01); *G01N 2203/0282* (2013.01)

(58) Field of Classification Search
CPC .... G01N 3/02; G01N 3/20; G01N 2203/0023; G01N 2203/0282; G01N 3/34; G06F 1/162; G06F 1/1618; G06F 1/1613; G06F 1/1601; G06F 1/1624; G06F 3/0412; G06F 1/16; F16C 11/04; E05D 3/02; E05D 3/122; G02F 1/133308; G02F 1/133305; H05K 5/0217
See application file for complete search history.

(56) References Cited

U.S. PATENT DOCUMENTS

| | | | |
|---|---|---|---|
| 2012/0067134 A1* | 3/2012 | Bell | ................ G02F 1/133305 73/849 |
| 2019/0154555 A1* | 5/2019 | Han | ........................ G01N 3/04 |
| 2019/0293535 A1* | 9/2019 | Lee | ........................ G01N 3/02 |

FOREIGN PATENT DOCUMENTS

| | | |
|---|---|---|
| KR | 10-2015-0016013 | 2/2015 |
| KR | 10-1527815 | 6/2015 |

(Continued)

*Primary Examiner* — Brandi N Hopkins
(74) *Attorney, Agent, or Firm* — KILE PARK REED & HOUTTEMAN PLLC

(57) ABSTRACT

A bending test apparatus includes a jig including first to third supporting members arranged in a first direction; a shaft member including a first shaft, a second shaft, and a third shaft extending in a second direction intersecting the first direction and respectively connected to the first to third supporting members; a driving member connected to the first shaft and providing a rotation force to the first shaft; a sliding member including a first slider and a second slider respectively connected to the second shaft and the third shaft; and a rail member extending in the first direction and guiding movements of the first slider and the second slider. When the first shaft rotates the first supporting member in a first rotation direction, the second and third supporting members rotate in a second rotation direction opposite to the first rotation direction.

20 Claims, 12 Drawing Sheets

100: 110, 120, 130
200: 210, 220, 230
400: 410, 420
500: 510, 520
600: 610, 620

(51) Int. Cl.
*G01N 3/34* (2006.01)
*G01N 3/02* (2006.01)

(56) References Cited

FOREIGN PATENT DOCUMENTS

| KR | 101527815 B1 * | 6/2015 | ............... G01N 3/04 |
| KR | 10-2015-0139135 | 12/2015 | |
| KR | 10-2019-0083805 | 7/2019 | |

* cited by examiner

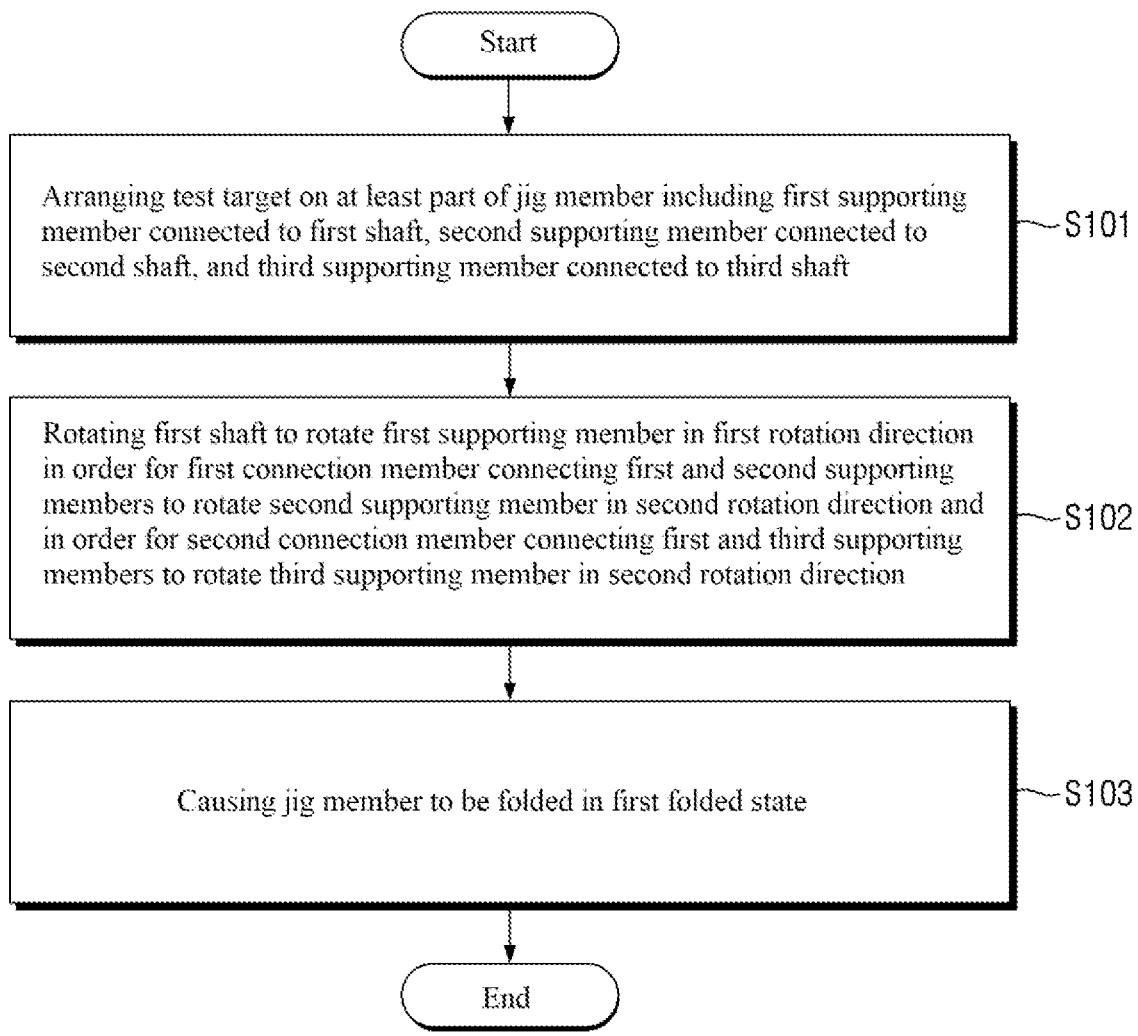

BENDING TEST APPARATUS AND BENDING TEST METHOD USING THE SAME

CROSS-REFERENCE TO RELATED APPLICATION(S)

This application claims priority to and benefits of Korean Patent Application No. 10-2020-0055604 under 35 U.S.C. § 119 filed on May 11, 2020 in the Korean Intellectual Property Office, the entire contents of which are incorporated herein by reference.

BACKGROUND

1. Technical Field

The disclosure relates to a bending test apparatus and a bending test method using the same.

2. Description of the Related Art

A flexible device may be characterized by being flexibly bent for the user's convenience. However, such a flexible device may break down, may be damaged, or deformed by bending stress, which brings up the necessity of a bending characteristic test or durability test against bending stress to the flexible device.

There is therefore a need of development of an apparatus and method for testing reliability of a flexible display, a flexible display panel, a flexible substrate, a base substrate of the flexible substrate, and a flexible device composed of enumerated components.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a bending test apparatus capable of performing various kinds of bending tests and a bending test method using the same.

Aspects of the disclosure also provide a bending test apparatus capable of reducing facility manufacturing and maintenance costs and a bending test method using the same.

However, aspects of the disclosure are not restricted to those set forth herein. The above and other aspects of the disclosure will become more apparent to one of ordinary skill in the art to which the disclosure pertains by referencing the detailed description of the disclosure given below.

An embodiment of a bending test apparatus may include a jig including a first supporting member; a second supporting member rotatably connected to a side of the first supporting member; and a third supporting member rotatably connected to another side of the first supporting member, wherein the first supporting member, the second supporting member, and the third supporting member are arranged in a first direction; a shaft member including a first shaft, a second shaft, and a third shaft, wherein the first shaft, the second shaft, and the third shaft extend in a second direction intersecting the first direction, and are respectively connected to the first supporting member, the second supporting member, and the third supporting member; a driving member connected to the first shaft and providing a rotation force to the first shaft; a sliding member including a first slider and a second slider respectively connected to the second shaft and the third shaft; and a rail member extending in the first direction and guiding movement of the first slider and movement of the second slider, wherein when the first shaft rotates the first supporting member in a first rotation direction, the second supporting member and the third supporting members rotate in a second rotation direction opposite to the first rotation direction.

The second supporting member and the third supporting member may be separated from the first supporting member by different gaps.

The side of the first supporting member may rotate upward, the another side of the first supporting member may rotate downward, and a gap between the first supporting member and the second supporting member may be greater than a gap between the first supporting member and the third supporting member.

A radius of curvature of a test target may determine a gap between the first supporting member and the second supporting member and may determine a gap between the first supporting member and the third supporting member.

The bending test apparatus may further include a first connection member connecting the first supporting member to the second supporting member; and a second connection member connecting the first supporting member to the third supporting member.

The first connection member may include a pair of first gears respectively connected to the first supporting member and the second supporting member, and the second connection member may include a pair of second gears respectively connected to the first supporting member and the third supporting member.

The side of the first supporting member may rotate upward, the another side of the second supporting member may rotate downward, and the pair of first gears of the first connection member may be larger in size than the pair of second gears of the second connection member.

A radius of curvature of a test target may determine sizes of the pair of first gears of the first connection member and the pair of second gears of the second connection member.

The rail member may include a first rail that guides the first slider; and a second rail that guides the second slider.

The first rail and the second rail may be respectively disposed at different distances from the jig.

The first rail and the second rail may at least partially overlap each other in the second direction.

The first rail and the second rail may be disposed at a same height.

When the first supporting member may rotate in the first rotation direction, the second shaft and the third shaft may move toward the first shaft.

The second shaft and the third shaft may move in parallel with the first direction.

When the first supporting member may rotate in the first rotation direction, the first slider and the second slider of the sliding member may move toward the first shaft.

The first slider and the second slider of the sliding member may be respectively disposed at different distances from the jig.

When the first supporting member may rotate in the first rotation direction, the jig may transition to a first folded state such that lower surfaces of the first supporting member and the second supporting member may face each other, and upper surfaces of the first supporting member and the third supporting member may face each other.

When the first supporting member may rotate in the second rotation direction in the first folded state, the jig may transition to a second folded state such that upper surfaces of the first supporting member and the second supporting member may face each other, and lower surfaces of the first supporting member and the third supporting member may face each other.

An embodiment of a bending test apparatus may include a first supporting member; a second supporting member disposed on a side of the first supporting member in a first direction; a third supporting member disposed on another side of the first supporting member in the first direction; a pair of first gears respectively connected to an edge of the first supporting member in the first direction and an edge of the second supporting member in the first direction; and a pair of second gears respectively connected to another edge of the first supporting member in the first direction and an edge of the third supporting member in the first direction, wherein the first supporting member rotates the pair of first gears to move a position of the edge of the second supporting member in the first direction, and the first supporting member rotates the pair of second gears to move a position of the edge of the third supporting member in the first direction.

An embodiment of a bending test method may include arranging a test target on a jig including a first supporting member connected to a first shaft, a second supporting member connected to a second shaft, and a third supporting member connected to a third shaft; rotating the first supporting member by the first shaft in a first rotation direction; rotating the second supporting member by a first connection member in a second rotation direction, the first connecting member connecting the first supporting member and the second supporting member; rotating the third supporting member by a second connection member in the second rotation direction, the second connection member connecting the first supporting member and the third supporting member; and rendering the jig in a folded state.

The bending test apparatus and bending test method using the same according to various embodiments may be able to perform various kinds of bending tests.

The bending test apparatus and bending test method using the same according to various embodiments may be able to reduce facility manufacturing and maintenance costs.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which:

FIG. 12 is a flowchart illustrating a bending test method using the bending test apparatus of FIG. 3.

DETAILED DESCRIPTION OF THE EMBODIMENTS

Figure 1:
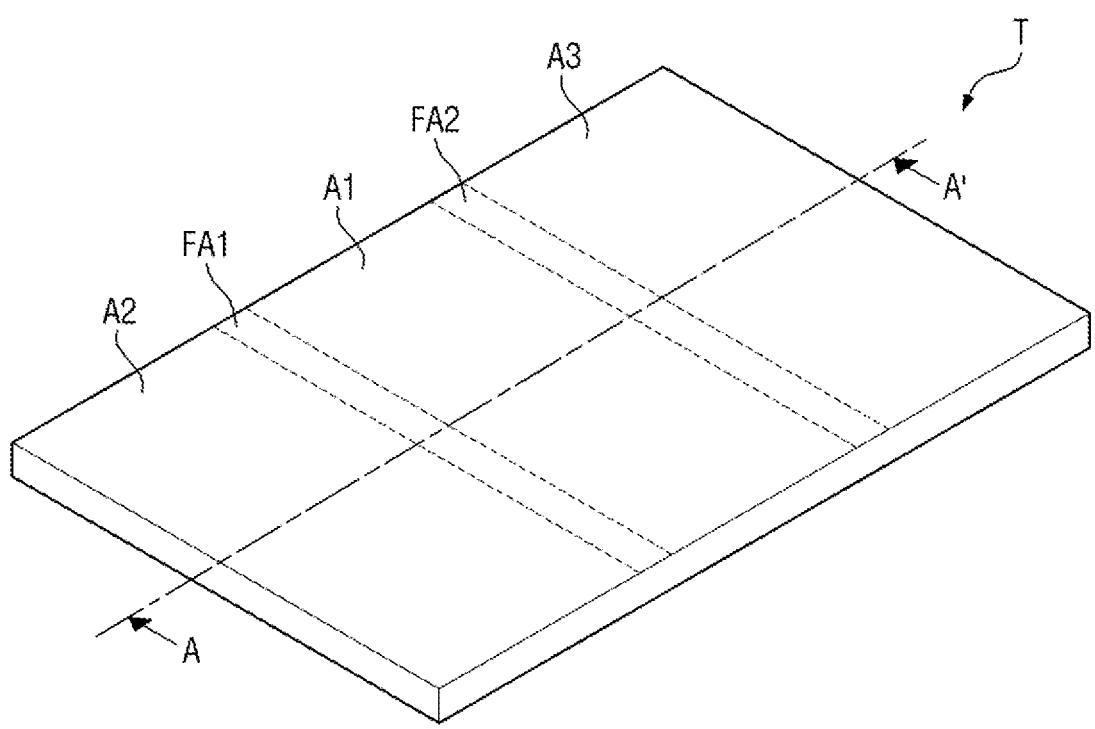
FIG. 1 is a perspective view illustrating a flexible display panel in relation to a bending test apparatus according to an embodiment.
Figure 1:
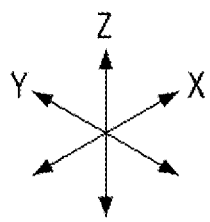

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B.

An expression used in the singular encompasses the expression of the plural, unless it has a clearly different meaning in the context.

In the specification, it is to be understood that the terms such as "including," "having," and "comprising" and variations thereof are intended to indicate the existence of the features or components disclosed in the specification, and are not intended to preclude the possibility that one or more other features or components may exist or may be added.

It will also be understood that when a layer is referred to as being "on" another layer or substrate, it may be directly on the other layer or substrate, or intervening layers may also be present. In contrast, when an element is referred to as being "directly on" another element, there are no intervening elements present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the embodiments below, when layers, areas, or elements or the like are referred to as being "connected," it will be understood that they may be directly connected or an intervening portion may be present between layers, areas or elements. For example, when layers, areas, or elements or the like are referred to as being "electrically connected," they may be directly electrically connected, or layers, areas or elements may be indirectly electrically connected and an intervening portion may be present.

In addition, terms such as "below," "lower," "above," "upper," and the like are used to describe the relationship of the configurations shown in the drawings. The terms are used as a relative concept and may be described with reference to the direction indicated in the drawings.

Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings.

A description is first made of a flexible display panel for convenience of explanation.

Figure 2:
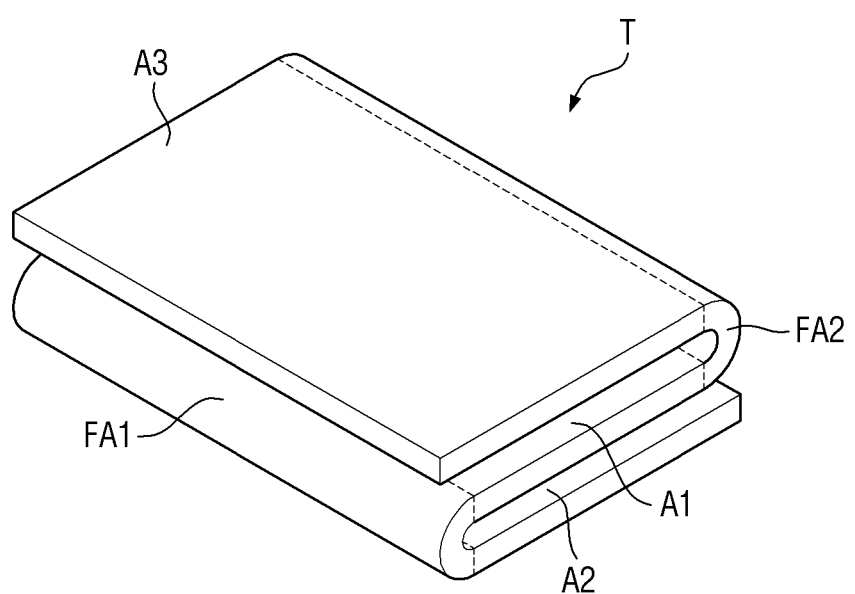
FIG. 2 is a perspective view of the flexible display panel of FIG. 1 in a folded state.
Figure 2:
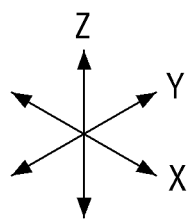
Figure 3:
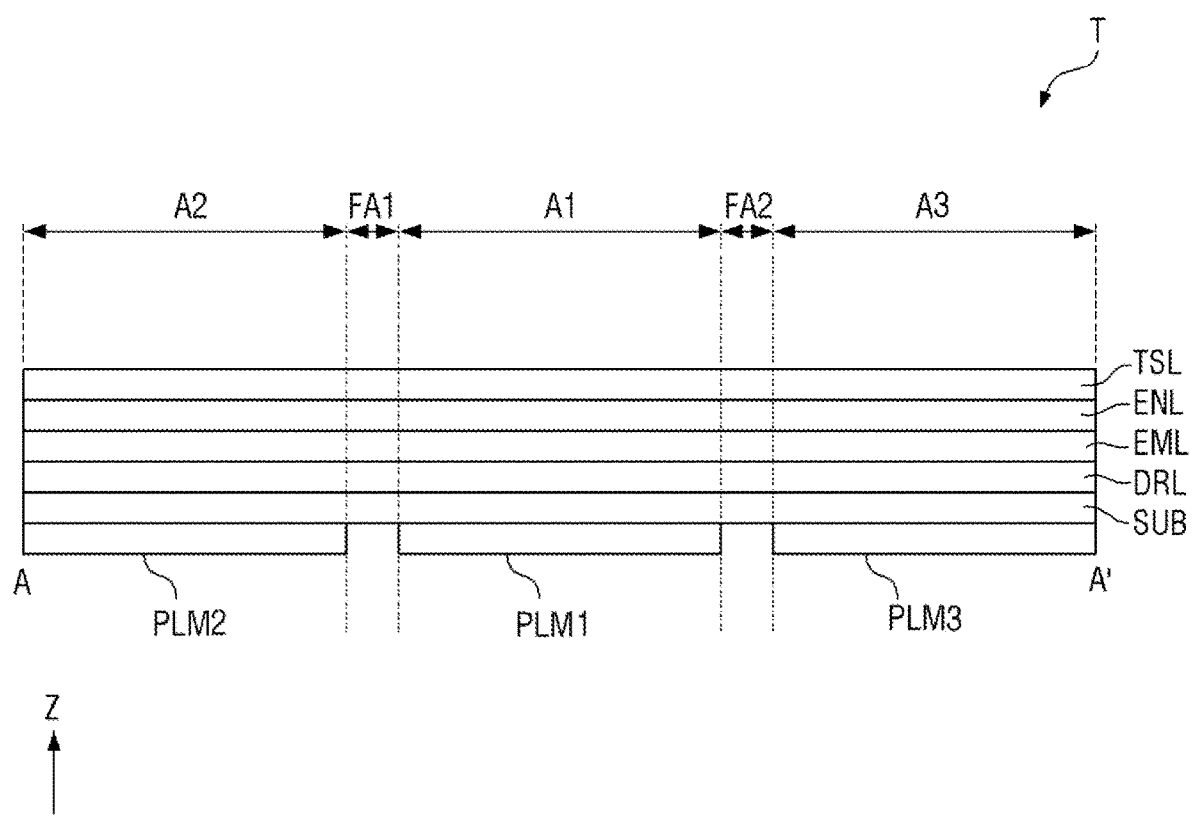
FIG. 3 is a schematic cross-sectional view taken along line A-A' of FIG. 1

FIG. 1 is a perspective view illustrating a flexible display panel in relation to a bending test apparatus according to an embodiment. FIG. 2 is a perspective view of the flexible display panel of FIG. 1 in a folded state. FIG. 3 is a schematic cross-sectional view taken along line A-A' of FIG. 1.

In reference to FIGS. 1 to 3, a flexible display panel is exemplified as a test target of the bending test apparatus. The flexible display panel may be a display panel having flexibility to be folded or unfolded. Hereinafter, the flexible display panel may be referred to as display panel T for convenience of explanation.

The display panel T may include a first area A1, a second area A2, a third area A3, a first folding area FA1 disposed between the first and second areas A1 and A2, and a second folding area FA2 disposed between the first and third areas A1 and A3. However, the disclosure is not limited thereto.

The first area A1, the second area A2, the third area A3, the first folding area FA1, and the second folding area FA2 may each have a substantially rectangular shape. The first area A1, the second area A2, the third area A3, the first folding area FA1, and the second folding area FA2 may each have two sides extending in a first direction X and two sides extending in a second direction Y crossing or intersecting the first direction. The two sides extending in the second direction Y may be longer than the two sides extending in the first direction X. However, the disclosure is not limited thereto.

The first area A1, the second area A2, the third area A3, the first folding area FA1, and the second folding area FA2 may be identical with or different from one another in size. In an embodiment, the first area A1, the second area A2, and the third area A3 may be identical in size with one another, and the first folding area FA1 and the second folding area FA2 may be identical in size with each other. Here, the sides of the first area A1, the second area A2, the third area A3, the first folding area FA1, and the second folding area FA2 extending in the second direction Y may be identical in length with one another.

Each of the first area A1, the second area A2, and the third area A3 may be greater in size than the first folding area FA1 or the second folding area FA2. In detail, the two sides of each of the first area A1, the second area A2, and the third area A3 extending in the first direction X may be longer than the two sides of each of the first folding area FA1 and the second folding area FA2 extending in the first direction X. In an embodiment, the first area A1 may be greater in size than each of the second and third areas A2 and A3.

The second and third areas A2 and A3 may be arranged symmetrically with respect to the first area A1. The first and second folding areas FA1 and FA2 may be arranged symmetrically with respect to the first area A1. The first and second folding areas FA1 and FA2 may be arranged in parallel with each other. In an embodiment, the second and third areas A2 and A3 and the first and second folding areas FA1 and FA2 may not be arranged symmetrically with respect to the first area A1.

Although depicted by way of example to have illustrated shapes, sizes, and arrangements in FIGS. 1 and 2, the first area A1, the second area A2, the third area A3, the first folding area FA1, and the second folding area FA2 may have various different shapes, sizes, and arrangements.

The first folding area FA1 of the display panel T may be out-folded, and the second folding area FA2 of the display panel T may be in-folded. In an embodiment, the term "in-folding" may mean that the display panel T is folded such that the display surface thereof may be bent to face inward, and the term "out-folding" may mean that the display panel T is folded such that the display surface thereof may be bent to face outward. The display surface may be a surface having a screen. In an embodiment, the term "in-folding" may mean that the display panel T is folded such that parts of one or a surface thereof may face each other, and the term "out-folding" may mean that the display panel T is folded such that parts of the other surface thereof may face each other. Here, the one or a surface may be the front surface of the display panel T, and the other surface may be the rear surface of the display panel T. The front surface may be, but is not limited to, a display surface for including a screen. For example, both the front and rear surfaces may be display surfaces. In an embodiment, the first folding area FA1 may be in-foldable, and the second folding area FA2 may be out-foldable.

The first folding area FA1 and/or the second folding area FA2 of the display panel T may be foldable in both directions. The folding in both directions may mean that one area may be, with respect to the folding area, folded in one direction to face one or a surface of another area and also in the other direction to face the other surface of the another area. For example, in FIG. 1, the second area A2 may rotate about 180° along the first folding area FA1 such that one or a surface or surfaces of the first and second areas A1 and A2 may face each other and about −180° along the first folding area FA1 such that the other surfaces of the first and second areas A1 and A2 may face each other.

In the folded state, the first and second folding areas FA1 and FA2 may each have a predetermined radius of curvature.

The display panel T may include a substrate SUB, a circuit driving layer DRL disposed on the substrate SUB, a light emitting layer EML disposed on the circuit driving layer DRL, an encapsulation layer ENL disposed on the light emitting layer EML, and a touch layer TSL disposed on the encapsulation layer ENL. The display panel T may include a first lower member PLM1, a second lower member PLM2, and a third lower member PLM3.

The substrate SUB may be a flexible substrate including a flexible polymer material such as polyimide or the like within the spirit and the scope of the disclosure. Accordingly, the display panel T may be bowed, bent, folded or rolled. In an embodiment, the substrate SUB may include sub-substrates overlapping in a thickness direction with a barrier layer disposed therebetween. In this case, each sub-substrate may be a flexible substrate.

The circuit driving layer DRL may be disposed on the substrate SUB. The circuit driving layer DRL may include a circuit that drives the light emitting layer EML of a pixel. The circuit driving layer DRL may include thin film transistors.

The light emitting layer EML may be disposed on the circuit driving layer DRL. The light emitting layer EML may include an organic light emitting layer. The light emitting layer EML may emit light with various luminance levels according to a driving signal transmitted from the circuit driving layer DRL.

The encapsulation layer ENL may be disposed on the light emitting layer EML. The encapsulation layer ENL may include an inorganic layer or a laminated layer of an inorganic layer and an organic layer.

The touch layer TSL may be disposed on the encapsulation layer ENL. The touch layer TSL may be a layer for recognizing a touch input, and may function as a touch member.

The touch layer TSL may include sensing areas and sensing electrodes.

In an embodiment, a substrate SUB, a circuit driving layer DRL, a light emitting layer EML, an encapsulation layer ENL, and a touch layer TSL may be arranged or disposed across the first area A1, the second area A2, the third area A3, the first folding area FA1, and the second folding area FA2. In an embodiment, at least one of the substrate SUB, the circuit driving layer DRL, the light emitting layer EML, the encapsulation layer ENL, and the touch layer TSL may be arranged or disposed in at least one of the first area A1, the second area A2, the third area A3, the first folding area FA1, and the second folding area FA2.

A first lower member PLM1, a second lower member PLM2, and a third lower member PLM3 may be arranged or disposed in the first area A1, the second area A2, and the third area A3, respectively. The first lower member PLM1, the second lower member PLM2, and the third lower member PLM3 may support the first area A1, the second area A2, and the third area A3, respectively. The first lower member PLM1, the second lower member PLM2, and/or the third lower member PLM3 may not be arranged or disposed in the first folding area FA1 and/or second folding area FA2 of the display panel T. This may reduce the folding stress at the first and second folding areas FA1 and FA2.

The distances between the first lower member PLM1, the second lower member PLM2, and the third lower member PLM3 may be the same or different from each other. In an embodiment, the distance between the first and second lower members PLM1 and PLM2 may be greater than the distance between the first and third lower members PLM1 and PLM3. Although the description may be directed to a case where the first folding area FA1 may be out-folded and the second folding area FA2 may be in-folded, the disclosure is not limited thereto.

Figure 4:
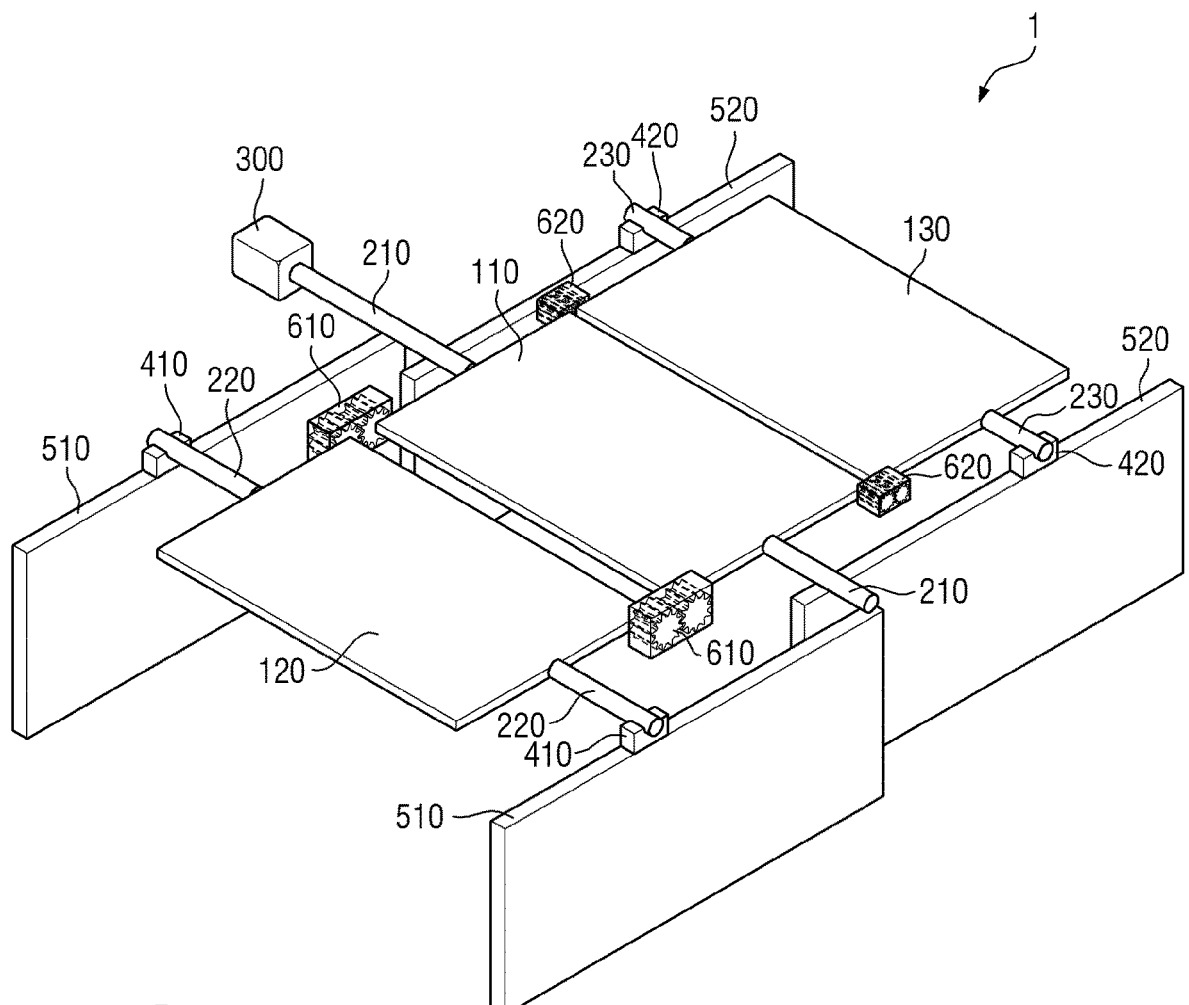
FIG. 4 is a perspective view of a bending test apparatus according to an embodiment.
Figure 5:
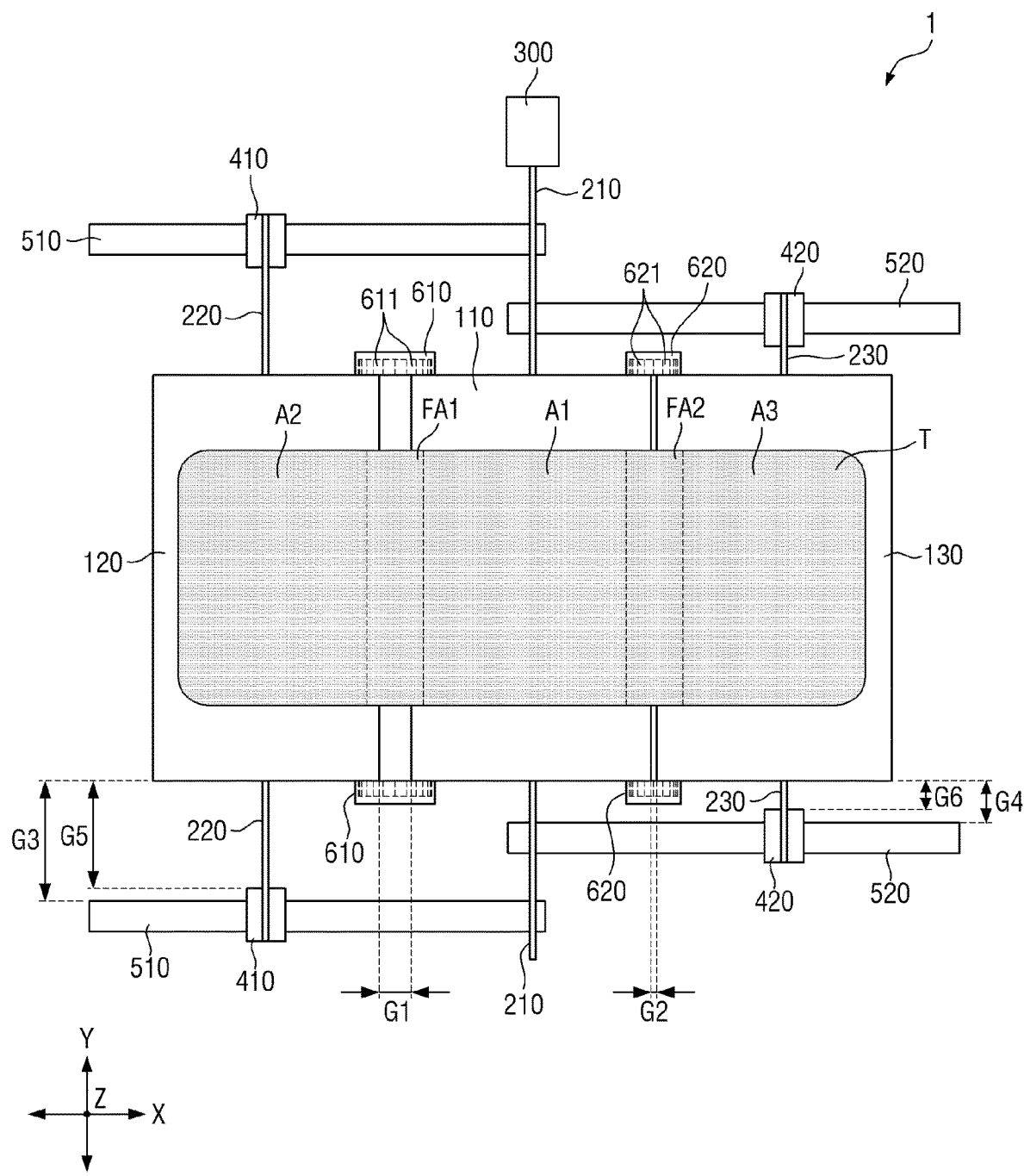
FIG. 5 is a plan view of the bending test apparatus of FIG. 4.

FIG. 4 is a perspective view of a bending test apparatus according to an embodiment. FIG. 5 is a plan view of the bending test apparatus of FIG. 4.

A bending test apparatus 1 according to an embodiment refers to an apparatus for testing reliability of a test target having flexibility. In the following description, the test target may include the display panel T of FIGS. 1 to 3, but is not limited thereto. For example, the test target may be a flexible device. As another example, the test target may be at least one of the parts constituting the display panel T such as a protection film, a cover window, a flexible substrate, and a base substrate of the flexible substrate. As another example, the test target may be at least one of the layers constituting the display panel T such as the circuit driving layer DRL, the light emitting layer EML, the encapsulation layer ENL, and/or the touch layer TSL. As another example, the test target may be a bendable member having at least one folding axis.

In embodiments, the first direction X, the second direction Y, and the third direction Z may cross or intersect each other in different directions. In the drawings, the first direction X may denote the lengthwise direction of the bending test apparatus 1, the second direction Y may denote the widthwise direction thereof, and the third direction Z may denote the heightwise direction thereof. The third direction Z may include the upper direction toward the top of the drawing and the lower direction toward the bottom of the drawing. In this respect, one or a surface of a member that faces the upper direction may be referred to as upper surface, and the other surface of the member that faces the lower direction may be referred to as lower surface. It should be understood, however, that a direction or directions mentioned in an embodiment refers/refer to a relative direction and an embodiment is not limited to the direction or directions mentioned.

In reference to FIGS. 4 and 5, the bending test apparatus 1 may include a jig member 100, a shaft member 200, a driving member 300, a sliding member 400, and a rail member 500. The bending test apparatus 1 may include a connection member 600.

The jig member 100 may fold or unfold the display panel T. The jig member 100 may include supporting members connected rotatably to each other. The jig member 100 may be folded and unfolded in accordance with rotations of supporting members.

The jig member 100 may include a first supporting member 110, a second supporting member 120, and a third supporting member 130.

The first supporting member 110, the second supporting member 120, and the third supporting member 130 may be arranged or disposed in the first direction X. In an embodiment, the first supporting member 110 may be arranged or disposed between the second and third supporting members 120 and 130.

The first supporting member 110, the second supporting member 120, and the third supporting member 130 may each include a substantially rectangular plate having an upper surface and a lower surface opposite to the upper surface. Although the first supporting member 110, the second supporting member 120, and the third supporting member 130 are depicted by way of example to have illustrated shapes and illustrated sizes, the disclosure is not limited thereto.

The first supporting member 110, the second supporting member 120, and the third supporting member 130 may support the display panel T. The display panel T may be fixed by a fixing member such as a clamp, a laminated adhesive layer, vacuum suction member, or the like within the spirit and the scope of the disclosure. In an embodiment, the display panel T may be aligned across the first to third supporting members 110 to 130. In detail, the first area A1, the second area A2, and the third area A3 of the display panel T may be respectively aligned on the first supporting member 110, the second supporting member 120, and the third supporting member 130. Here, the first folding area FA1 may be aligned between the first and second supporting members 110 and 120, and the second folding area FA2 may be aligned between the first and third supporting members 110 and 130. In an embodiment, the display panel T may be aligned across only the first and second supporting members 110 and 120 or the first and third supporting members 110 and 130. For example, the bending test apparatus 1 may simultaneously test two display panels T each having one folding axis as well as one display panel T having two folding axes to be foldable in a substantially Z-shape.

The first supporting member 110 may rotate by the rotation force from the driving member 300 to be described later. The first rotation member 110 may rotate in a first rotation direction and/or a second rotation direction opposite to the first rotation direction. For example, the first rotation direction may be a clockwise direction, and the second rotation direction may be a counter-clockwise direction.

The second supporting member 120 may be rotatably connected to one or a side of the first supporting member 110, and the third supporting member 130 may be rotatably connected to the other side of the first supporting member 110. The first to third supporting members 110 to 130 may be rotatably connected to each other by means of the connection member 600 to be described later.

In the case where the first supporting member 110 rotates, the second and third supporting members 120 and 130 may rotate in the opposite directions by interworking with the first supporting member. For example, in the case where the first supporting member 110 rotates in the first rotation direction, the second and third supporting members 120 and 130 may rotate in the second rotation direction. For example, the driving member 300, to be described later, may transmit a rotation force to one or a supporting member such that the other supporting members rotate to interwork therewith, which may make it possible for the bending test apparatus 1 to perform both the in-folding and out-folding tests with one or a driving member 300. For example, the first supporting member 110 may have a rotation angle in an approximate range from about 0° to about 90° or from about 0° to about −90°. Furthermore, the first supporting member 110 may rotate in the first rotation direction and then the second rotation direction, and the second and third supporting members 120 and 130 may rotate in the second rotation direction and then the first rotation direction by interworking with the first supporting member 110. In this manner, the bending test apparatus 1 may carry out the folding test in both directions. For example, the first supporting member 110 may have a rotation angle in an approximate range from about 0° to about 180° or from about −90° to about 90°.

In an embodiment, the first to third supporting members 110 to 130 may be connected in the first direction X such that the first and third supporting members 110 and 130 may rotate in the first rotation direction while the second supporting member 120 may rotate in the second rotation direction.

The first supporting member 110, the second supporting member 120, and the third supporting member 130 may be spaced apart from each other. In detail, the first and second supporting members 110 and 120 may be separated by a first gap G1, and the first and third supporting members 110 and 130 may be separated by a second gap G2. In an embodiment, the first gap G1 may be greater than the second gap G2. In an embodiment, the first gap G1 may be about equal to or less than the second gap G2.

The gaps between the first and second supporting members 110 and 120 and between the first and third supporting members 110 and 130 may vary according to the radius of curvature of the first folding area FA1 and/or the second folding area FA2 of the display panel T. The radius of curvature may be determined based on a folding direction of the display panel T, a folding scheme, and/or a distance between the lower members of the display panel T. In an embodiment, the first folding area FA1 for out-folding the display panel T may be aligned across the first and second supporting members 110 and 120, and the second folding area FA2 for in-folding the display panel T may be aligned across the first and third supporting member 110 and 130.

The first gap G1 may be greater than the second gap G2. In an embodiment, the first gap G1 may be less than the distance between the first and second lower members PLM1 and PLM2 of the display panel T, and the second gap G2 may be less than the distance between the first and third lower members PLM1 and PLM3.

The shaft member 200 may provide a rotational axis for rotation of the supporting members. The shaft member 200 may include shafts extending in the second direction Y in parallel and respectively connected with the supporting members.

The shaft member 200 may include a first shaft 210, a second shaft 220, and a third shaft 230.

The first shaft 210 may be connected with the first supporting member 110. The first shaft 210 may be connected to the driving member 300. The first shaft 210 may rotate the first supporting member 110 with the rotation force from the driving member 300.

The second and third shafts 220 and 230 may be respectively connected with the second and third supporting members 120 and 130. The first shaft 210, the second shaft 220, and the third shaft 230 may be formed to be separated from or integrated with the first supporting member 110, the second supporting member 120, and the third supporting member 130, respectively. In an embodiment, the first supporting member 110 may be fixedly connected to the first shaft 210, and the second and third supporting members 120 and 130 may be rotatably connected to the second and third shafts 220 and 230, respectively. In an embodiment, the first to third supporting members 110 to 130 may be fixedly connected to the first to third shafts 210 to 230, respectively, and the second and third shafts 220 and 230 may be rotatably connected respectively with a first sliding member 410 and a second sliding member 420 as to be described later. Although the rotational axes of the first shaft 210, the second shaft 220, and the third shaft 230 may be respectively arranged or disposed to pass through the centers of the first supporting member 110, the second supporting member 120, and the third supporting member 130 in an embodiment, the disclosure is not limited thereto.

The driving member 300 may provide a rotation force for folding or unfolding the jig member 100. In an embodiment, the driving member 300 may be connected with the first shaft 210 to provide a rotation force for rotating the first supporting member 110. In an embodiment, the driving member 300 may be connected with the second shaft 220 or the third shaft 230. The driving member 300 may include a driving motor such as a servomotor by way of example as a driving means for rotating the first shaft 210.

The sliding member 400 may be connected to the shaft member 200 and may be slidably coupled with a rail member 500 to be described later. The sliding member 400 may be arranged or disposed symmetrically at both ends of the shaft member 200.

The sliding member 400 may include a first slider 410 and a second slider 420.

The first slider 410 may be connected with the second shaft 220. The first slider 410 may be rotatably connected with the second shaft 220 and slidably coupled with a first rail 510 of the rail member 500. The first slider 410 may linearly move in the first direction X along the first rail 510 of the rail member 500. The first slider 410 may include a pair of parts connected with both ends of the second shaft 220.

The second slider 420 may be connected with the third shaft 230. The second slider 420 may be rotatably connected with the third shaft 230 and slidably coupled with a second rail 520 of the rail member 500. The second slider 420 may linearly move in the first direction X along the second rail 520 of the rail member 500. The second slider 420 may include a pair of parts connected with both ends of the third shaft 230.

The first and second sliders 410 and 420 may be spaced apart from each other in the second direction Y. The first and second sliders 410 and 420 may be arranged or disposed to be separated by equal or different distances from the jig member 100. In an embodiment, the first slider 410 may be arranged or disposed to be separated by a fifth gap G5 from the jig member 100, and the second slider 420 may be arranged or disposed to be separated by a sixth gap G6 from the jig member 100. The fifth gap G5 may be greater than the sixth gap G6. Although the second slider 420 may be arranged or disposed closer than the first slider 410 to the jig member 100 in an embodiment, the disclosure is not limited thereto.

Although the first and second sliders 410 and 420 may each be a linear motion guide in an embodiment, the disclosure is not limited thereto.

The rail member 500 may extend in the first direction X to guide the movement of the sliding member 400. The rail member 500 may be symmetrically arranged or disposed at both sides of the jig member 100.

The rail member 500 may include the first rail 510 and the second rail 520.

The first rail 510 may guide the movement of the first slider 410, and the second rail 520 may guide the movement of the second slider 420.

The first and second rails 510 and 520 may be spaced apart from the jig member 100 in the second direction Y. The first and second rails 510 and 520 may be arranged or disposed to be separated by equal or different distances from the jig member 100. In an embodiment, the first rail 510 may be arranged or disposed to be separated by a third gap G3 from the jig member 100, and the second rail 520 may be arranged or disposed to be separated by a fourth gap G4 from the jig member 100. The third gap G3 may be greater than the fourth gap G4. Although the second rail 520 may be arranged or disposed closer than the first rail 510 to the jig member 100 in an embodiment, the disclosure is not limited thereto.

The first and second rails 510 and 520 may be arranged or disposed to be at least partly overlapped. In detail, the first and second rails 510 and 520 may be arranged or disposed to be at least partly overlapped in the second direction Y. This may make it possible to secure a sufficient sliding distance of the first slider 410 and/or the second slider 420 for folding or unfolding the jig member 100. The first shaft 210 may be arranged or disposed to cross the first and second rails 510 and 520 where the first and second rails 510 and 520 may overlap each other. In an embodiment, the first and second rails 510 and 520 may be separated by a predetermined distance in the second direction Y to avoid interference between the first and second sliders 410 and 420.

The first and second rails 510 and 520 may be arranged or disposed at the same height. Accordingly, the first slider 410, the second slider 420, the first shaft 210, the second shaft 220, and/or the third shaft 230 may horizontally move at the same height.

The connection member 600 may connect the supporting members rotatably to each other.

The connection member 600 may include a first connection member 610 and a second connection member 620.

The first connection member 610 may connect the first and second supporting members 110 and 120 rotatably to each other. The first connection member 610 may include a pair of first gears 611 coupled respectively with the first and second supporting members 110 and 120.

The second connection member 620 may connect the first and third supporting members 110 and 130 rotatably to each other. The second connection member 620 may include a pair of second gears 621 coupled respectively with the first and third supporting members 110 and 130.

The first and second gears 611 and 621 may be identical with or different from each other in size. The sizes of the first and second gears 611 and 621 may include radii of the first gear 611 and the second gear 621, respectively. In an embodiment, the first gear 611 may be larger in size than the second gear 621. In an embodiment, the first gear 611 may be about equal to or less than the second gear 621 in size.

The sizes of the first and second gears 611 and 621 may each vary according to the radius of curvature of the first folding area FA1 and/or the second folding area FA2 of the display panel T. The radius of curvature may be determined based on a folding direction of the display panel T, a folding scheme, and/or a distance between the first, second, and third lower members PLM1, PLM2, and PLM3 of the display panel T. In an embodiment, the first folding area FA1 for out-folding the display panel T may be aligned across the first and second supporting members 110 and 120, and the second folding area FA2 for in-folding the display panel T may be aligned across the first and third supporting member 110 and 130. The first gear 611 may be larger in size than the second gear 621. In an embodiment, the radius of the first gear 611 may be less than about half the distance between the first and second lower members PLM1 and PLM2, and the radius of the second gear 621 may be less than about half the distance between the first and third lower members PLM1 and PLM3.

Hereinafter, a description is made of the operation of the bending test apparatus 1 with reference to FIGS. 6 to 11.

Figure 6:
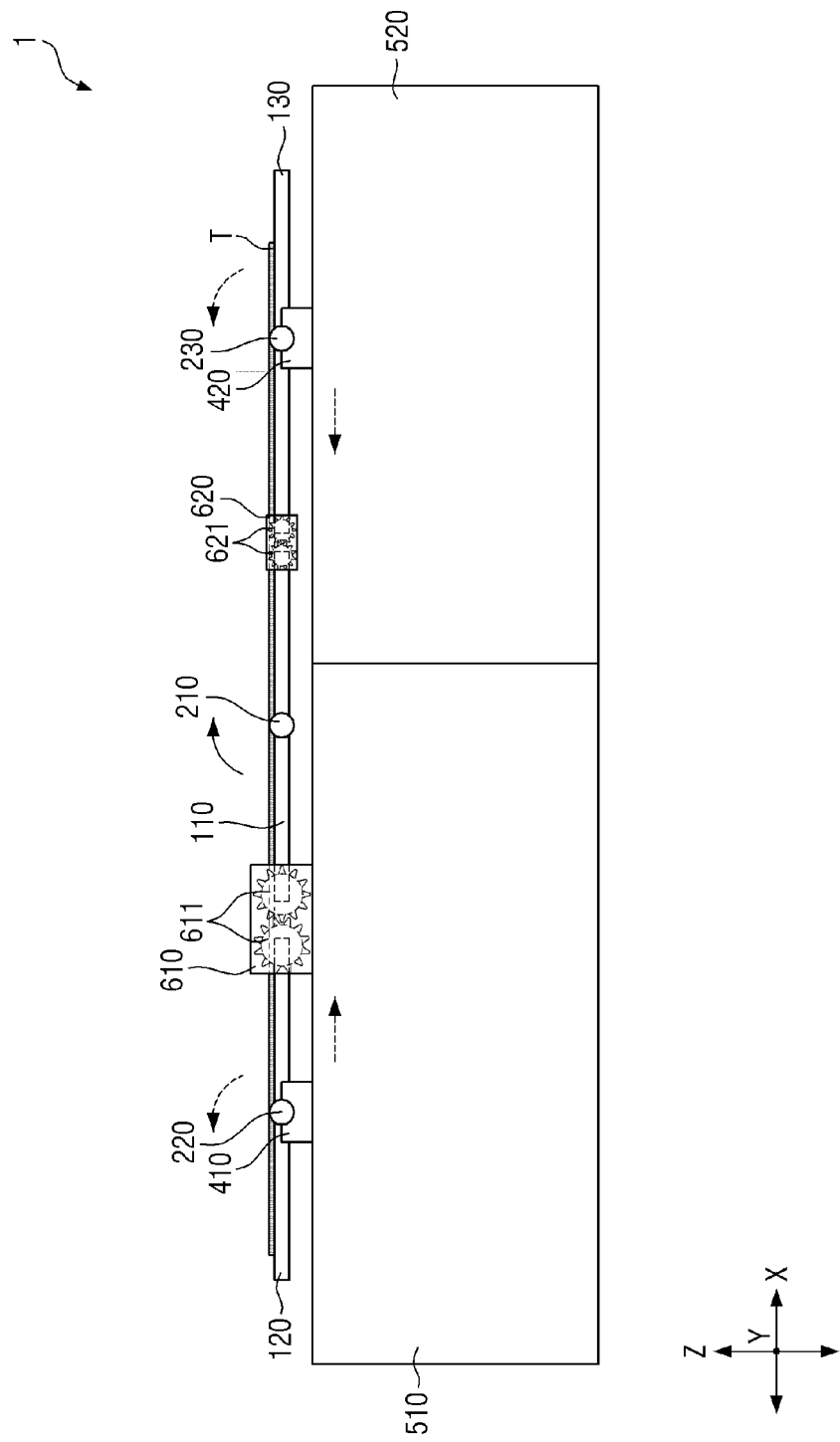
FIGS. 6 to 8 are views illustrating the jig member of the bending test apparatus of FIG. 1 transitioning from an unfolded state to a first folded state.
Figure 7:
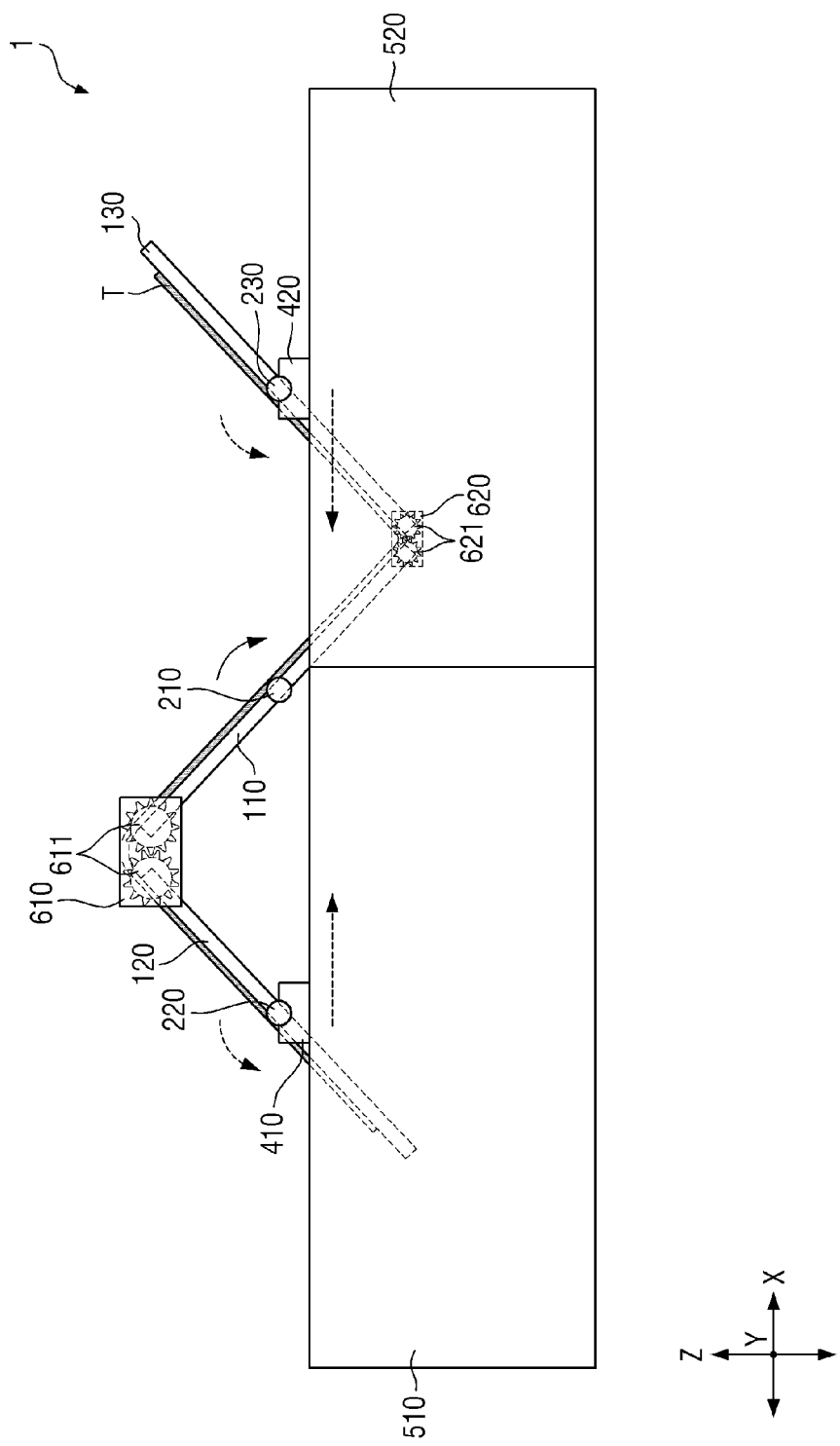
Figure 8:
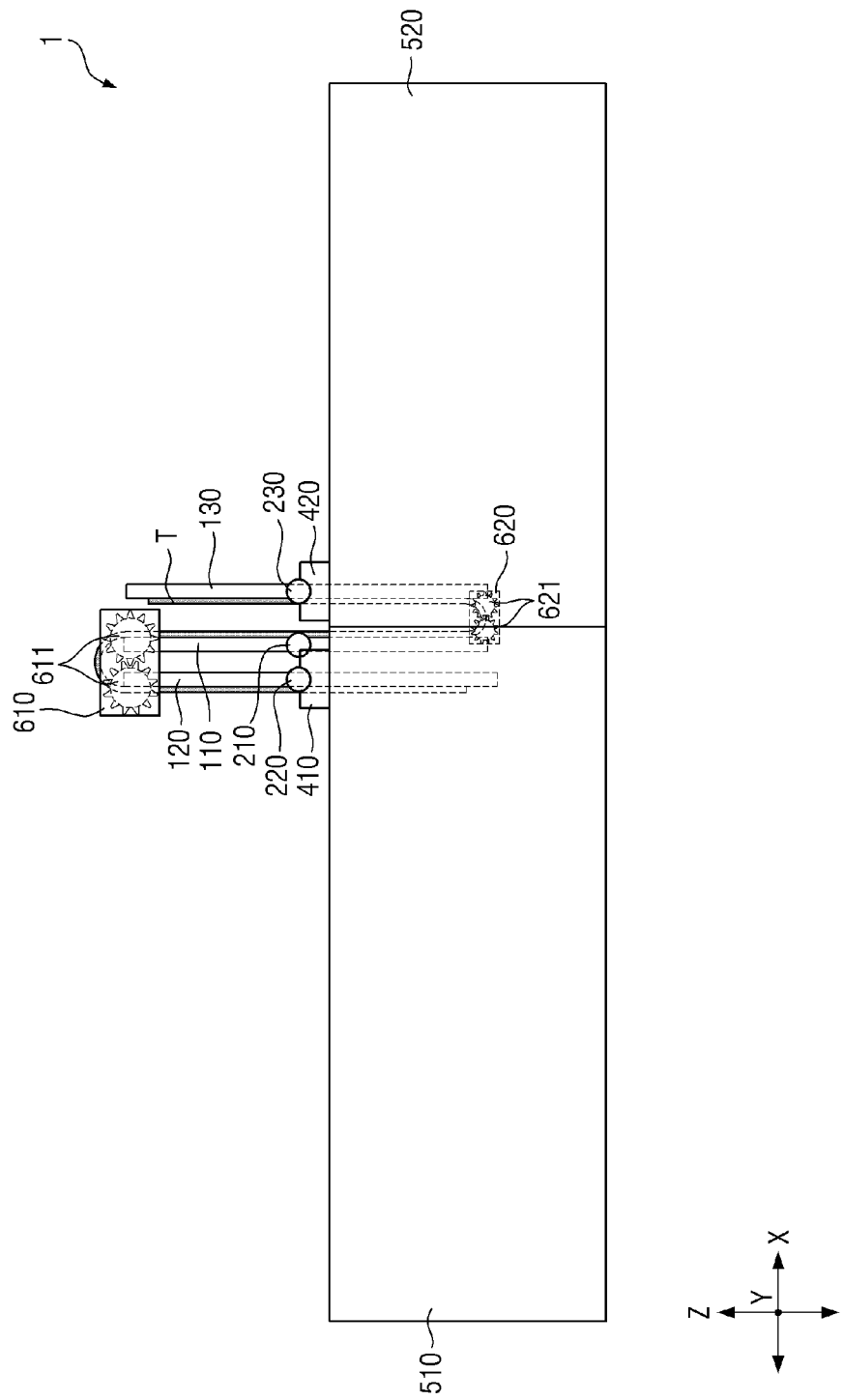
Figure 9:
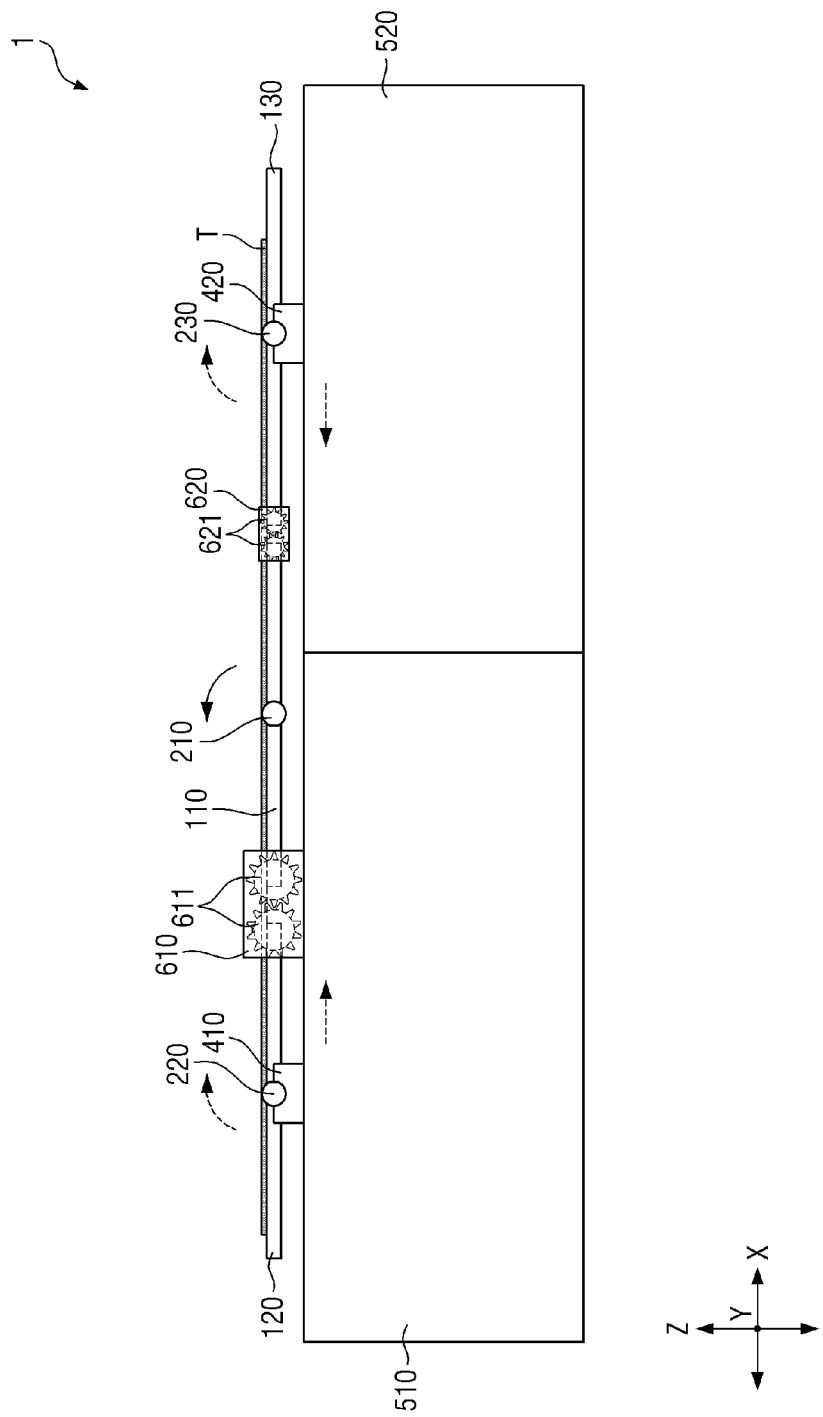
FIGS. 9 to 11 are views illustrating the jig member of the bending test apparatus of FIG. 1 transitioning from an unfolded state to a second folded state.
Figure 10:
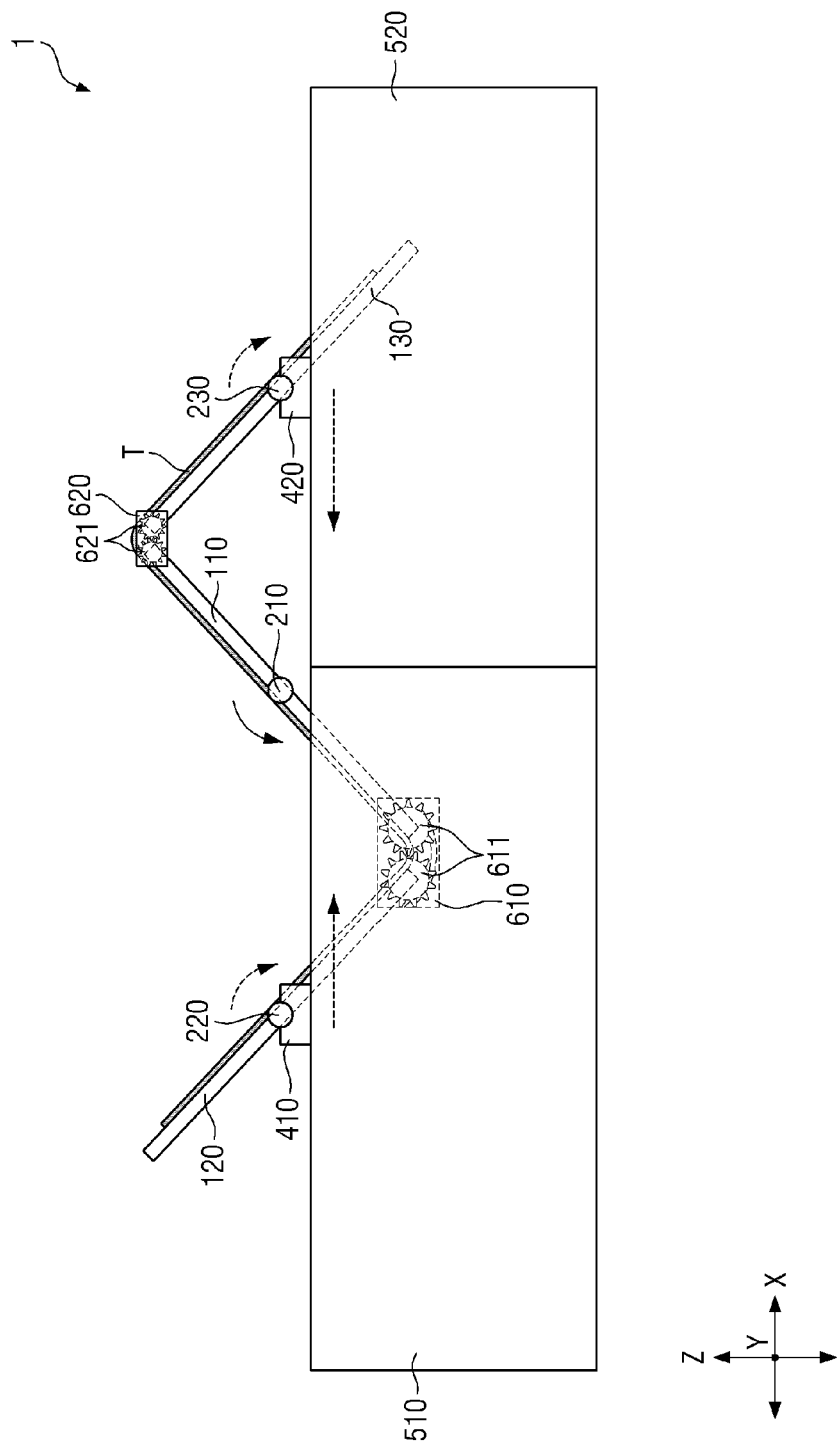
Figure 11:
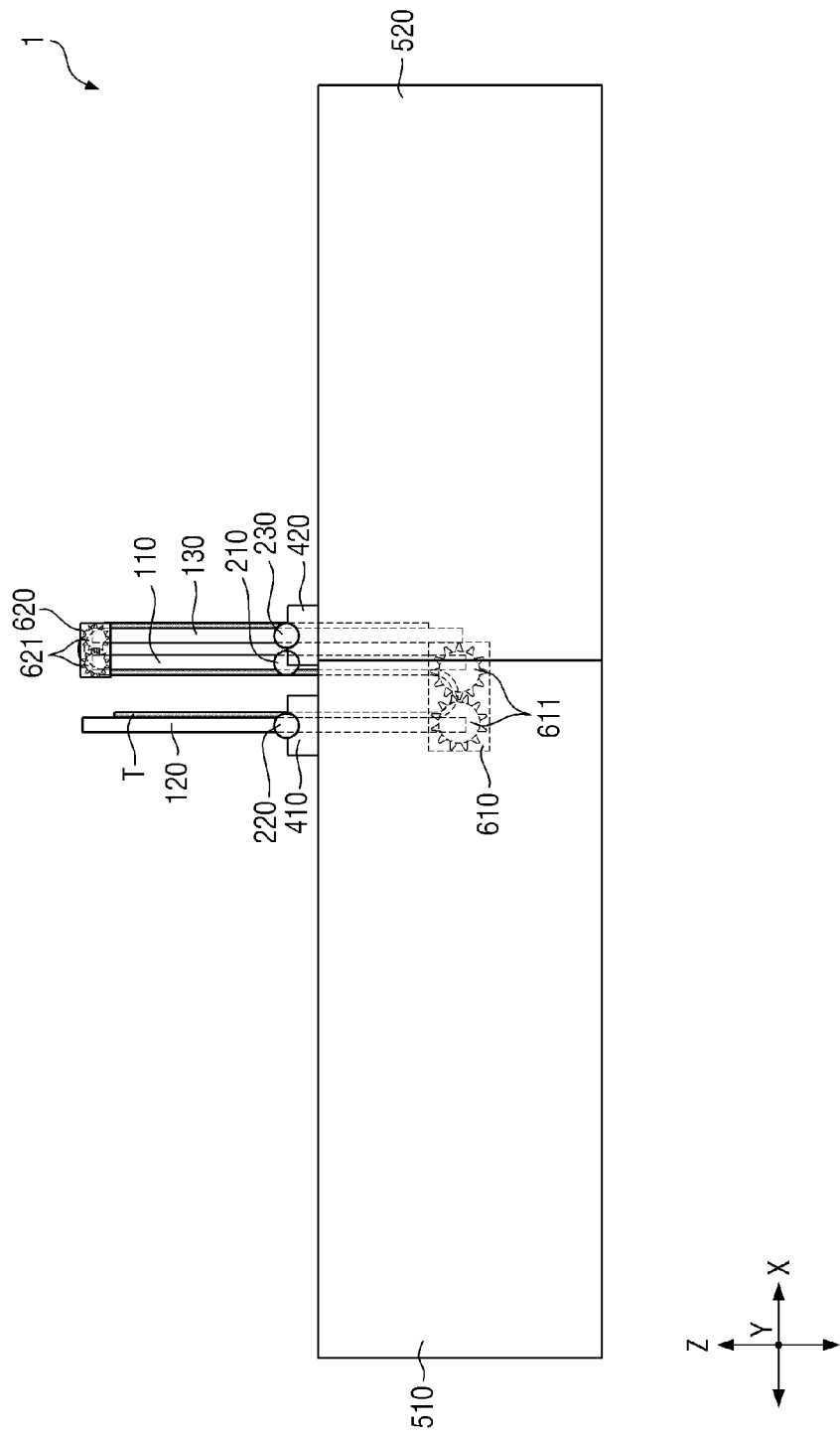

FIGS. 6 to 8 are views illustrating the jig member of the bending test apparatus of FIG. 1 transitioning from an unfolded state to a first folded state. FIGS. 9 to 11 are views illustrating the jig member of the bending test apparatus of FIG. 1 transitioning from an unfolded state to a second folded state.

FIG. 6 is a side view illustrating the bending test apparatus of which the jig member may be in an unfolded state. FIG. 7 is a side view illustrating a bending test apparatus of which the jig member may be transitioning from an unfolded state to a first folded state. FIG. 8 is a side view illustrating a bending test apparatus of which the jig member may be in a first folded state.

In the following description, a state where the jig member 100 may be completely unfolded in order for the first to third supporting members 110 to 130 to be level with one another may be referred to as the unfolded state for convenience of explanation. As an example, a state where the jig member 100 may be folded in order for the lower surfaces of the first and second supporting members 110 and 120 to face each other and for the upper surfaces of the first and third supporting members 110 and 130 to face each other may be referred to as the first folded state, and a state where the jig member 100 may be folded in order for the upper surfaces of the first and second supporting members 110 and 120 to face each other and for the lower surfaces of the first and third supporting members 110 and 130 to face each other may be referred to as the second folded state.

In reference to FIGS. 6 to 8, the jig member 100 may transition to the unfolded state or the first folded state in accordance with rotations of the first to third supporting members 110 to 130.

In detail, in the case where the first supporting member 110 rotates in the first rotation direction, the second and third supporting members 120 and 130 may rotate in the second rotation direction, interworking with the first supporting member 110. In detail, by rotating the first supporting member 110 to move up its end close to the second supporting member 120 and move down the other end close to the third supporting member 130, it may be possible to move up one or an end of the second supporting member 120 that may be close to the first supporting member 110 with the first connection member 610 and may be possible to move down one or an end of the third supporting member 130 that may be close to the first supporting member 110 with the second connection member 620.

In the case where the first supporting member 110 may rotate in the first rotation direction, the second and third shafts 220 and 230 may move in the opposite directions toward the first shaft 210. Accordingly, the first shaft 210, the second shaft 220, and the third shaft 230 may draw near each other. During the transition from the unfolded state to the first folded state, the first shaft 210, the second shaft 220, and the third shaft 230 may move such that the heights thereof may remain level.

The first shaft 210, the second shaft 220, and the third shaft 230 may be arranged or disposed such that the heights thereof may be separated by a predetermined distance from the rail member 500. The predetermined height may be about equal to or higher than that of each of the first and second sliders 410 and 420. This may make it possible to avoid interference between the first to third shafts 210 to 230 and the first and second sliders 410 and 420. Although not shown, the bending test apparatus 1 may include a shaft supporting member for supporting the first shaft 210 at a predetermined height.

In the case where the first supporting member 110 may rotate in the first rotation direction, the first and second sliders 410 and 420 may move close to each other. In detail, the first and second slider 410 and 420 may move toward the first shaft 210. During the transition from the unfolded state to the first folded state, the first and second sliders 410 and 420 may move such that the heights thereof may remain level.

In the case where the first supporting member 110 rotates in the first rotation direction, the first area A1 of the display panel T that may be aligned across the first and second supporting members 110 and 120 may be out-folded, and the second area A2 of the display panel T aligned across the first and third supporting members 110 and 130 may be in-folded.

The jig member 100 may transition from the unfolded state to the first folded state and proceed to transition back to the unfolded state. Because the transition from the first folded state to the unfolded state may be carried out in the reverse manner of transitioning from the unfolded state to the first folded state, detailed description thereof is omitted hereinafter.

The bending test apparatus 1 may be able to test the display panel T having both the out-foldable first area A1 and the in-foldable second area A2 using one or a driving member 300 by repeating transition between the unfolded state and the first folded state.

FIG. 9 is a side view illustrating the bending test apparatus of which the jig member is in the unfolded state. FIG.

10 is a side view illustrating the bending test apparatus of which the jig member may be transitioning from the unfolded state to the second folded state. FIG. 11 is a side view illustrating the bending test apparatus of which the jig member may be in the second folded state.

In reference to FIGS. 9 to 11, the jig member 100 may transition to the unfolded state or the second folded state in accordance with the rotation of the first to third supporting members 110 to 130.

In detail, in the case where the first supporting member 110 may rotate in the second rotation direction, the second and third supporting members 120 and 130 may rotate in the first rotation direction, interworking with the first supporting member 110. The second rotation direction may be opposite to the first rotation direction. In detail, by rotating the first supporting member 110 to move down its one end close to the second supporting member 120 and move up the other end close to the third supporting member 130, it may be possible to move down one or an end of the second supporting member 120 that may be close to the first supporting member 110 with the first connection member 610 and may be possible to move up one or an end of the third supporting member 130 that may be close to the first supporting member 110 with the second connection member 620.

In the case where the first supporting member 110 may rotate in the second rotation direction, the second and third shafts 220 and 230 and the first and second sliders 410 and 420 may move in the opposite directions toward the first shaft 210. Because the second and third shafts 220 and 230 and the first and second sliders 410 and 420 may move in substantially the same manner as described with reference to FIGS. 6 to 8, the detailed description thereof is omitted hereinafter.

In the case where the first supporting member 110 may rotate in the second rotation direction, the first area A1 of the display panel T that may be aligned across the first and second supporting member 110 and 120 may be in-folded, and the second area A2 of the display panel T that may be aligned across the first and third supporting members 110 and 130 may be out-folded.

The jig member 100 may transition from the unfolded state to the second folded state and proceed to transition back to the unfolded state. During the transition from the second folded state to the unfolded state may be carried out in the reverse manner of transitioning from the unfolded state to the second folded state, detailed description thereof is omitted hereinafter.

The bending test apparatus 1 may be able to test the display panel T having both the in-foldable first area A1 and the out-foldable second area A2 using one or a driving member 300 by repeating transition between the unfolded state and the second folded state.

The jig member 100 may transition from the unfolded state to the first folded state and proceed to transition to the unfolded state and then the second folded state.

The bending test apparatus 1 may be able to test the display panel T having the first and second areas A1 and A2 foldable in two directions using one or a driving member 300 by repeating transition between the unfolded state, the first folded state, and the second folded state. Furthermore, the bending test apparatus 1 may test a display panel T having two folding areas and two display panels T each having one folding area.

FIG. 12 is a flowchart illustrating a bending test method using the bending test apparatus of FIG. 3.

In reference to FIGS. 1 to 12, the bending test method may include arranging a test target on at least part of the jig member 100 including the first supporting member 110 connected to the first shaft 210, the second supporting member 120 connected to the second shaft 220, and the third supporting member 130 connected to the third shaft 230 at step S101, rotating the first shaft 210 to rotate the first supporting member 110 in the first rotation direction in order for the first connection member 610 connecting the first and second supporting members 110 and 120 to rotate the second supporting member 120 in the second rotation direction and in order for the second connection member 620 connecting the first and third supporting members 110 and 130 to rotate the third supporting member 130 in the second rotation direction at step S102, and causing or rendering the jig member 100 to be folded in the first folded state at step S103.

The bending test method may include, but is not limited to, at least one of the steps of unfolding the folded jig member 100, rotating the first shaft 210 to rotate the first supporting member 110 in the second rotation direction, causing the first connection member 610 connecting the first and second supporting members 110 and 120 to rotate the second supporting member 120 in the first rotation direction and causing the second connection member 620 connecting the first and third supporting members 110 and 130 to rotate the third supporting member 130 in the first rotation direction, moving the first slider 410 connected to the second shaft 220 and the second slider 420 connected to the third shaft 230 along the rail member 500, and folding the jig member 100 into the second folded state.

The above-described bending test method is only an example bending test method and may be implemented by omitting at least one of the above-described steps or adding at least one other or another step based on the operation of the bending test apparatus described with reference to FIGS. 4 to 11.

In concluding the detailed description, those skilled in the art will appreciate that many variations and modifications may be made to the embodiments without substantially departing from the principles of the disclosure. Therefore, the disclosed embodiments are used in a generic and descriptive sense only and not for purposes of limitation.

What is claimed is:
1. A bending test apparatus comprising:
   a jig including:
      a first supporting member;
      a second supporting member rotatably connected to a side of the first supporting member; and
      a third supporting member rotatably connected to another side of the first supporting member,
   wherein the first supporting member, the second supporting member, and the third supporting member are arranged in a first direction;
   a shaft member including a first shaft, a second shaft, and a third shaft, wherein the first shaft, the second shaft, and the third shaft extend in a second direction intersecting the first direction, and are respectively connected to the first supporting member, the second supporting member, and the third supporting member;
   a driving member connected to the first shaft and providing a rotation force to the first shaft;
   a sliding member including a first slider and a second slider respectively connected to the second shaft and the third shaft; and
   a rail member extending in the first direction and guiding movement of the first slider and movement of the second slider, wherein when the first shaft rotates the first supporting member in a first rotation direction, the second supporting member and the third supporting member rotate in a second rotation direction opposite to the first rotation direction.

2. The bending test apparatus of claim 1, wherein the second supporting member and the third supporting member are separated from the first supporting member by different gaps.

3. The bending test apparatus of claim 2, wherein
the side of the first supporting member rotates upward,
the another side of the first supporting member rotates downward, and
a gap between the first supporting member and the second supporting member is greater than a gap between the first supporting member and the third supporting member.

4. The bending test apparatus of claim 2, wherein a radius of curvature of a test target determines a gap between the first supporting member and the second supporting member and determines a gap between the first supporting member and the third supporting member.

5. The bending test apparatus of claim 1, further comprising:
a first connection member connecting the first supporting member to the second supporting member; and
a second connection member connecting the first supporting member to the third supporting member.

6. The bending test apparatus of claim 5, wherein
the first connection member includes a pair of first gears respectively connected to the first supporting member and the second supporting member, and
the second connection member includes a pair of second gears respectively connected to the first supporting member and the third supporting member.

7. The bending test apparatus of claim 6, wherein
the side of the first supporting member rotates upward,
the another side of the second supporting member rotates downward, and
the pair of first gears of the first connection member is larger in size than the pair of second gears of the second connection member.

8. The bending test apparatus of claim 6, wherein a radius of curvature of a test target determines sizes of the pair of first gears of the first connection member and the pair of second gears of the second connection member.

9. The bending test apparatus of claim 1, wherein the rail member includes:
a first rail that guides the first slider; and
a second rail that guides the second slider.

10. The bending test apparatus of claim 9, wherein the first rail and the second rail are respectively disposed at different distances from the jig.

11. The bending test apparatus of claim 10, wherein the first rail and the second rail at least partially overlap each other in the second direction.

12. The bending test apparatus of claim 9, wherein the first rail and the second rail are disposed at a same height.

13. The bending test apparatus of claim 1, wherein when the first supporting member rotates in the first rotation direction, the second shaft and the third shaft move toward the first shaft.

14. The bending test apparatus of claim 13, wherein the second shaft and the third shaft move in parallel with the first direction.

15. The bending test apparatus of claim 1, wherein when the first supporting member rotates in the first rotation direction, the first slider and the second slider of the sliding member move toward the first shaft.

16. The bending test apparatus of claim 1, wherein the first slider and the second slider of the sliding member are respectively disposed at different distances from the jig.

17. The bending test apparatus of claim 1, wherein when the first supporting member rotates in the first rotation direction, the jig transitions to a first folded state such that lower surfaces of the first supporting member and the second supporting member face each other, and upper surfaces of the first supporting member and the third supporting member face each other.

18. The bending test apparatus of claim 17, wherein when the first supporting member rotates in the second rotation direction in the first folded state, the jig transitions to a second folded state such that upper surfaces of the first supporting member and the second supporting member face each other, and lower surfaces of the first supporting member and the third supporting member face each other.

19. A bending test apparatus comprising:
a first supporting member;
a second supporting member disposed on a side of the first supporting member in a first direction;
a third supporting member disposed on another side of the first supporting member in the first direction;
a pair of first gears respectively connected to an edge of the first supporting member in the first direction and an edge of the second supporting member in the first direction; and
a pair of second gears respectively connected to another edge of the first supporting member in the first direction and an edge of the third supporting member in the first direction, wherein
the first supporting member rotates the pair of first gears to move a position of the edge of the second supporting member in the first direction, and
the first supporting member rotates the pair of second gears to move a position of the edge of the third supporting member in the first direction.

20. A bending test method comprising:
arranging a test target on a jig including a first supporting member connected to a first shaft, a second supporting member connected to a second shaft, and a third supporting member connected to a third shaft;
rotating the first supporting member by the first shaft in a first rotation direction;
rotating the second supporting member by a first connection member in a second rotation direction, the first connection member connecting the first supporting member and the second supporting member;
rotating the third supporting member by a second connection member in the second rotation direction, the second connection member connecting the first supporting member and the third supporting member; and
rendering the jig in a folded state.

* * * * *